United States Patent
Urbina Escos et al.

(10) Patent No.: US 11,170,559 B2
(45) Date of Patent: Nov. 9, 2021

(54) SUB-PIXEL DATA SIMULATION SYSTEM

(71) Applicant: Microsoft Technology Licensing, LLC, Redmond, WA (US)

(72) Inventors: Pedro Urbina Escos, Seattle, WA (US); Dimitrios Lymberopoulos, Kirkland, WA (US); Di Wang, Sammamish, WA (US); Emanuel Shalev, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/530,793

(22) Filed: Aug. 2, 2019

(65) Prior Publication Data

US 2021/0035350 A1 Feb. 4, 2021

(51) Int. Cl.
*G06T 15/06* (2011.01)
*G06T 15/20* (2011.01)
*G06N 20/00* (2019.01)
*G06T 15/00* (2011.01)

(52) U.S. Cl.
CPC ............ *G06T 15/20* (2013.01); *G06N 20/00* (2019.01); *G06T 15/005* (2013.01); *G06T 15/06* (2013.01)

(58) Field of Classification Search
CPC ....... G06T 15/06; G06T 15/20; G06T 15/005; G06T 2210/61; G06T 11/001; G06T 11/003
See application file for complete search history.

(56) References Cited

U.S. PATENT DOCUMENTS

| 10,127,392 | B1 | 11/2018 | Anderson et al. |
| 10,311,629 | B2 * | 6/2019 | Baldwin ............... G06T 15/005 |
| 2015/0262409 | A1 * | 9/2015 | Morgan ................. G06T 15/60 345/421 |
| 2020/0301799 | A1 * | 9/2020 | Manivasagam ......... G06T 17/20 |

OTHER PUBLICATIONS

"International Search Report and Written Opinion Issued in PCT Application No. PCT/US2020/036794", dated Nov. 16, 2020, 30 Pages.

* cited by examiner

*Primary Examiner* — Antonio A Caschera
(74) *Attorney, Agent, or Firm* — Alleman Hall Creasman & Tuttle LLP

(57) ABSTRACT

A computer device includes a processor configured to simulate a virtual environment based on a set of virtual environment parameters, and perform ray tracing to render a view of the simulated virtual environment. The ray tracing includes generating a plurality of rays for one or more pixels of the rendered view of the simulated virtual environment. The processor is further configured to determine sub-pixel data for each of the plurality of rays based on intersections between the plurality of rays and the simulated virtual environment, and store the determined sub-pixel data for each of the plurality of rays in an image file.

20 Claims, 11 Drawing Sheets

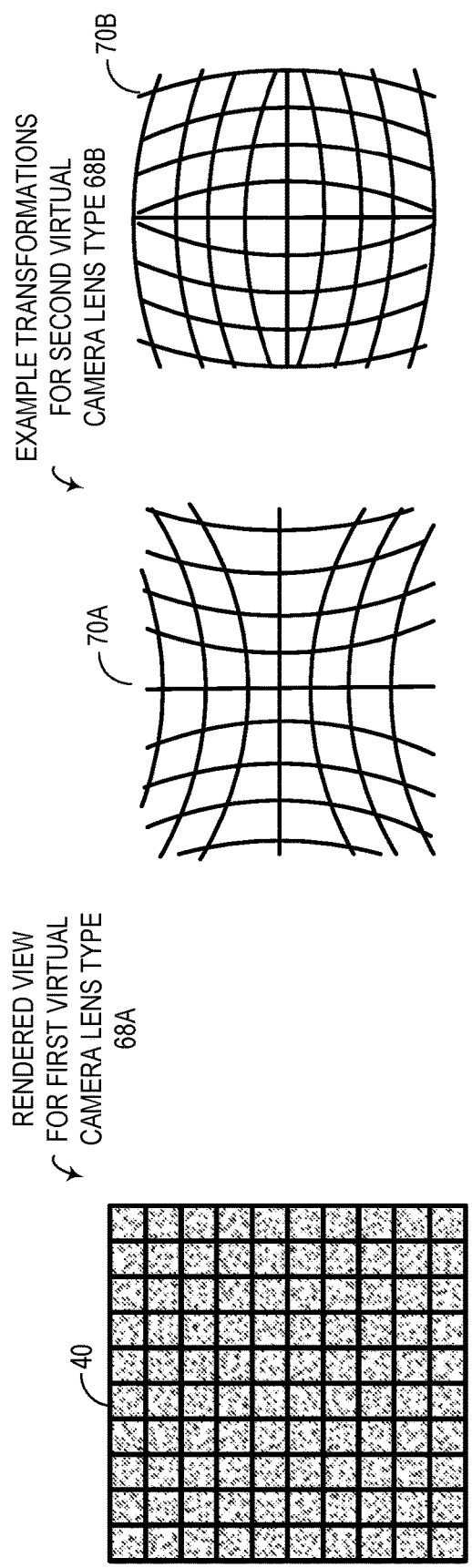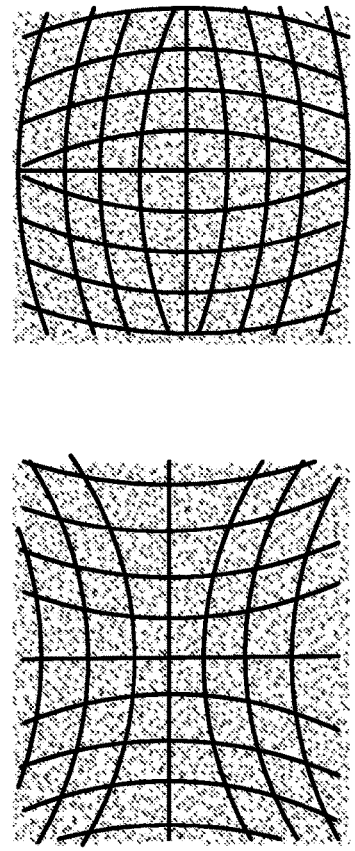
FIG. 7A
FIG. 7B
FIG. 7C

SUB-PIXEL DATA SIMULATION SYSTEM

BACKGROUND

Synthetics data may be used to generate labeled data at scale for machine learning tasks and for computer vision algorithm development and evaluation. In comparison, real capture data may typically require a user to manually capture images, which may provide less scalability than synthetics data. Further, ground truth data for real capture data is typically generated in additional post-processing steps, for example by human labeling, and thus is typically less scalable than synthetics data. Further, the ground truth data itself, while generally presumed to be accurate, in certain instances may actually be less accurate than synthetics data, as explained in more detail below.

SUMMARY

A computer device is provided that may comprise a processor configured to simulate a virtual environment based on a set of virtual environment parameters, and perform ray tracing to render a view of the simulated virtual environment. The ray tracing may include generating a plurality of rays for one or more pixels of the rendered view of the simulated virtual environment. The processor may be further configured to determine sub-pixel data for each of the plurality of rays based on intersections between the plurality of rays and the simulated virtual environment, and store the determined sub-pixel data for each of the plurality of rays in an image file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7A shows an example view rendered using a first virtual camera lens type for the virtual environment simulated by the computer device of FIG. 1.

FIG. 7B shows visual examples of transformations for applying distortion effects caused by a second virtual camera lens types to the example view rendered by the computer device of FIG. 1.

FIG. 7C shows an example of regrouping the rays generated during rendering of the virtual environment simulated by the computer device of FIG. 1.

DETAILED DESCRIPTION

Synthetics data may include information that is algorithmically generated using computer simulations, and may provide advantages over real data that is captured via direct measurement, such as, for example, a camera image captured by a physical camera. For example, synthetics data may be used to generate labeled data at scale for machine learning tasks and for computer vision algorithm development and evaluation. In comparison, real capture data may typically require a user to manually capture images, which may provide less scalability than synthetics data. Further, ground truth data for real capture data is typically generated post-process, which may potentially be less accurate and less scalable than synthetics data.

Figure 1:
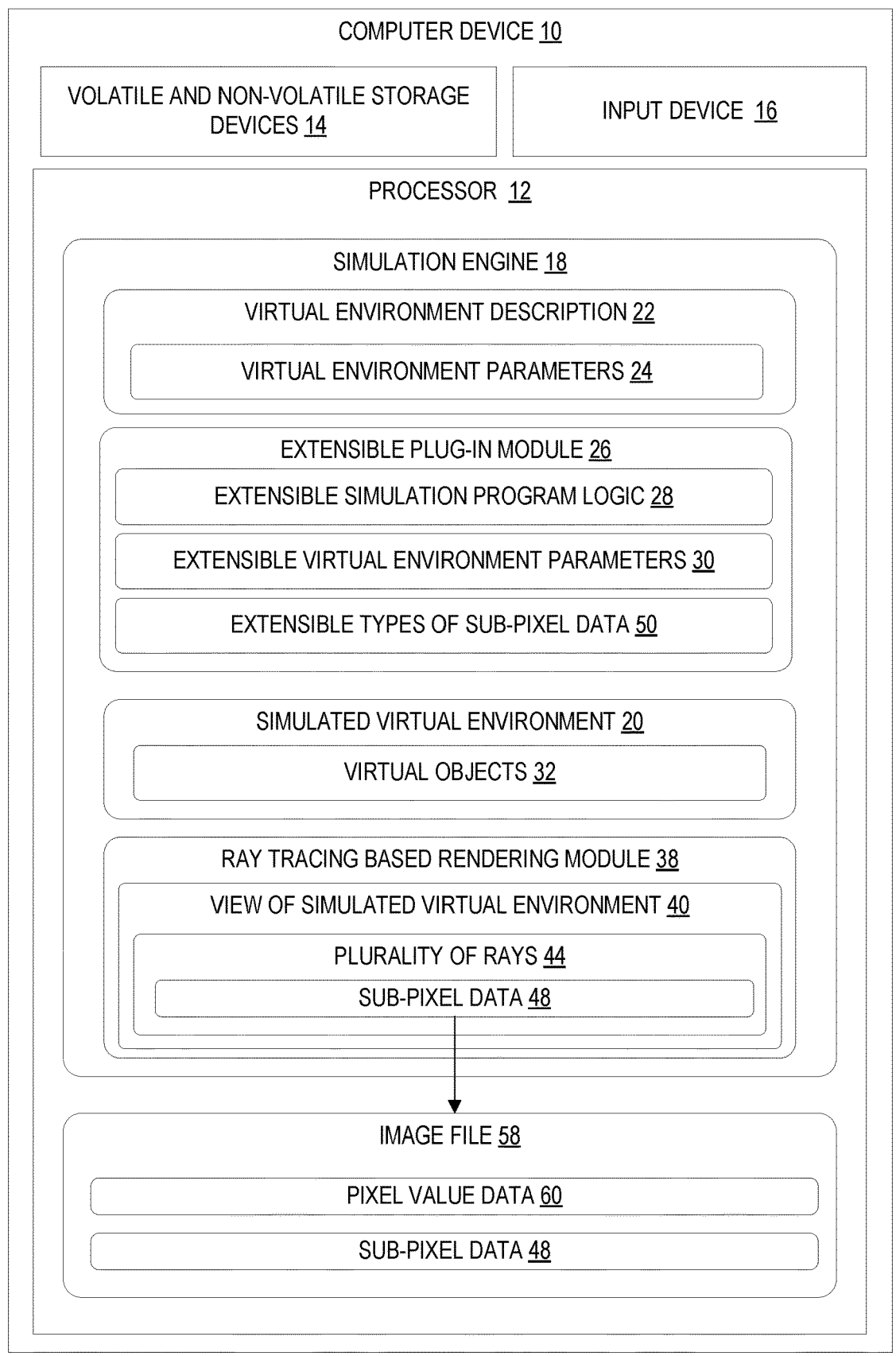
FIG. 1 shows a schematic view of a computer device for generating synthetics data that includes sub-pixel data using simulated virtual environments, according to one embodiment of the present disclosure.

To address these issues, FIG. 1 illustrates a computer device 10 configured to generate synthetics data using simulated virtual environments that may, for example, be used to improve computer vision tasks and train machine learning models. The computer device 10 includes a processor 12, volatile and non-volatile storage devices 14, an input device 16, and other suitable computer components. In one example, the computer device 10 may take the form of a desktop computer device, laptop computer device, or another type of personal computer device. However, it should be appreciated that the computer device 10 may take other suitable forms, such as, for example, a server computer device or multiple server computer devices operating in a cloud computing configuration. In a cloud computing configuration, multiple processors 12 from multiple computer devices may operate in concert to implement the techniques and processes described herein.

The processor 12 is configured to execute a simulation engine 18 configured to simulate virtual environments and render those virtual environments using ray trace techniques. The simulation engine 18 is configured to simulate a virtual environment 20 based on a virtual environment description 22 that may include a set of virtual environment parameters 24. The virtual environment description 22 may include virtual object data and other types of scene component data that may be used by the simulation engine 18 to simulate the virtual environment 20. One or more virtual objects simulated in the virtual environment 20 may be described by the virtual environment parameters 24. For example, the virtual environment parameters 24 may include parameters such as, for example, virtual object types, virtual object dimensions, virtual object materials, and other parameters that may be used to simulate one or more virtual objects in the virtual environment 20. As a few other non-limiting examples, the virtual environment parameters 24 may indicate a path of travel, velocity, etc., for one or more virtual objects that may be used to simulate movement of those virtual objects in the virtual environment 20.

The virtual environment parameters 24 may also include parameters that describe other aspects of the virtual environment 20 to be simulated. For example, the virtual environment parameters 24 may include parameters that indicate environment physics, environment effects, environment weather, virtual light sources, and other aspects of the virtual environment. The environment physics may, for example, include gravity parameters, friction parameters, and other types of parameters that may be used by the simulation engine 18 to simulate the physics of the virtual environment 20 and physical interactions such as collision between virtual objects. The virtual light sources parameters may include positions and orientations of light sources in the virtual environment 20, such as, for example, a sun light source, a lightbulb light source, and other types of light sources that may emit light in different types of patterns and different fields of illumination. The virtual light source parameters may also indicate a wavelength of light being emitted from those virtual light sources.

The virtual environment parameters 24 may also include parameters for a virtual camera from which the simulated virtual environment 20 will be rendered. These parameters may include, for example, virtual camera position and orientation, virtual camera lens type, and other aspects of the virtual camera such as field of view, pixel resolution, filters, etc.

It should be appreciated that the virtual environment parameters 24 discussed above are merely exemplary, and that the computer device 10 may be configured to simulate virtual environments 20 based on other types of virtual environment parameters 24 not specifically described herein.

The simulation engine 18 may include a default or base set of virtual environment parameters 24 that may be selected. In one example, the processor 12 may be further configured to modify the set of virtual environment parameters 24 based on user input. The user input may, for example, be received by the input device 16, which may take the form of a keyboard and mouse or another type of input device 16. For example, the simulation engine 18 may include a graphical user interface that the user may interact with to add, delete, modify, or otherwise customize the set of virtual environment parameters 24. In another example, the set of virtual environment parameters 24 may be customized by the user via another application program and saved in a file that may be loaded by the simulation engine 18.

In one example, the simulation engine 18 may be configured to be extensible. For example, the simulation engine 18 may be configured to include an extensible plug-in 26 that includes an application programming interface (API). User may develop plug-ins utilizing functions of the API of the extensible plug-in 26 to modify aspects of the simulation engine 18. For example, the extensible plug-in 26 may allow users to develop extensible simulation program logic 28 to modify or provide new functionality to the simulation engine 18. As a specific example, the default program logic of the simulation engine 18 may not include logic for appropriately simulating joint/skeletal movement of a person. Thus, a user may author a plug-in that includes functions and algorithms that may be implemented by the simulation engine 18 to appropriately simulate joint/skeletal movement. It should be appreciated that other types of functionality and programming logic may be developed by users and implemented by the simulation engine 18 via the extensible plug-in module 26.

The simulation engine 18 may provide a default or base set of virtual environment parameters 24. In one example, the set of environment parameters 24 may further be extensible. The extensible plug-in module 26 may provide a function for a user to add new extensible virtual environment parameters 30. These extensible virtual environment parameters 30 may interact with the default program logic of the simulation engine 18. In another example, the extensible virtual environment parameters 30 may be developed alongside the extensible simulation program logic 28, and may thus be configured to be handled by the new program logic and functionality provided by the plug-in authored by the user.

Figure 2:
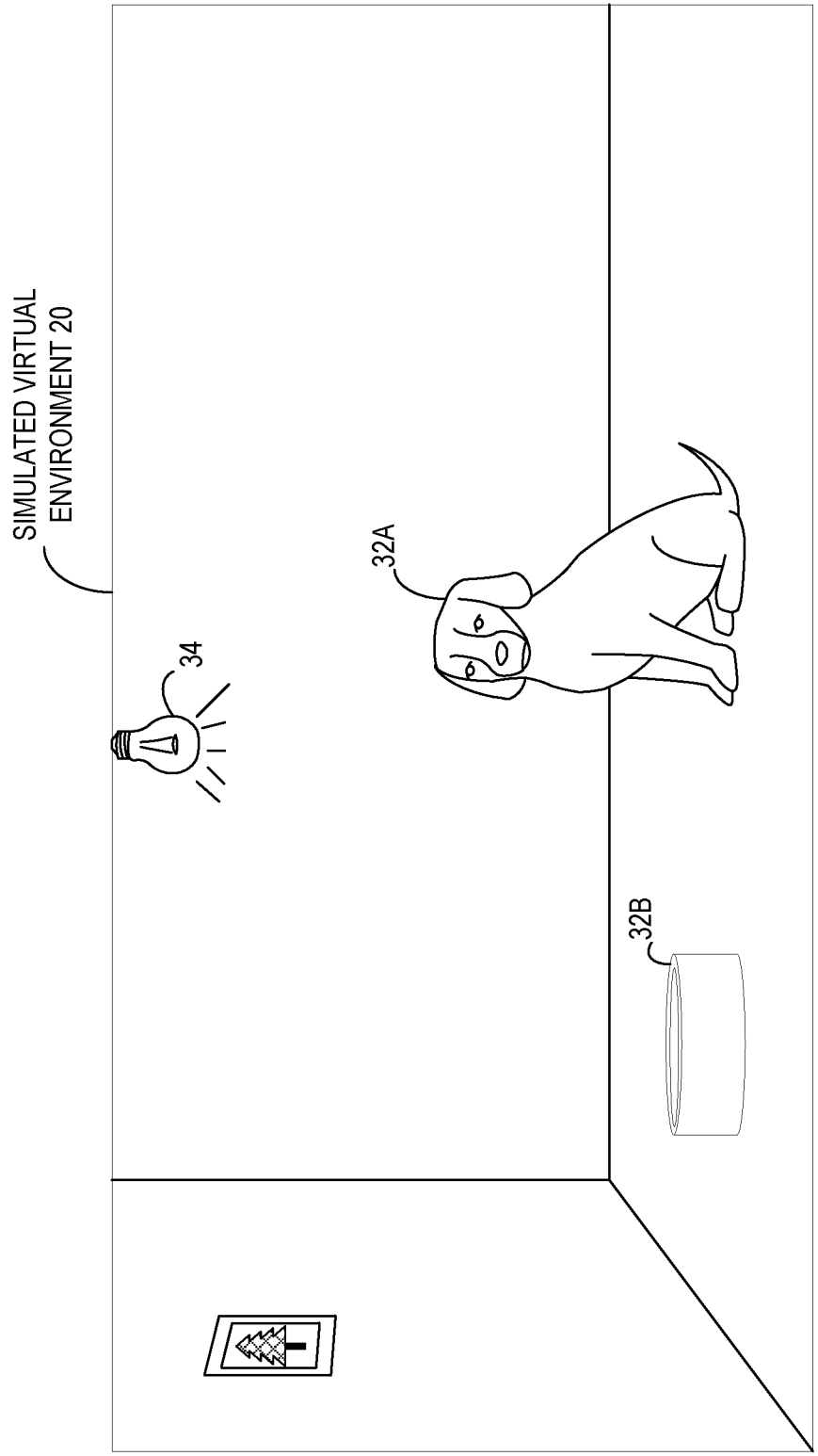
FIG. 2 shows a view of an example virtual environment simulated by the computer device of FIG. 1.

The simulation engine 18 is configured to simulate the virtual environment 20 based on the virtual environment description 22 based on default simulation program logic and/or extensible simulation program logic 28 provided in a plug-in to the extensible plug-in module 26. FIG. 2 illustrates an example simulated virtual environment 20. The simulated virtual environment 20 includes several virtual objects 32. In the specific example illustrated in FIG. 2, the virtual environment 20 includes a dog virtual object 32A and a water bowl virtual object 32B. The example simulated virtual environment 20 also includes background objects, such as the walls and floors behind the dog virtual object 32A and the water bowl virtual object 32B. Additionally, the example simulated virtual environment 20 includes a light source 34 emitting light into the virtual environment. As discussed above, each of these components of the virtual environment 20 may be described by the virtual environment parameters 24 of the virtual environment description 22. The user may change or modify these parameters to affect the simulated virtual environment 20 to achieve a suitable simulation.

As discussed above, the virtual environment parameters 24 may indicate various aspects of each of these scene components. For example, the virtual environment parameters 24 may indicate that the dog virtual object 32A has a dog object type, a fur material type, etc. The virtual environment parameters 24 may also indicate that the water bowl virtual object 32B has a bowl object type, a metallic material type, etc. The virtual environment parameters 24 may also indicate the positions and orientations of these virtual objects within the virtual environment. As these virtual environment parameters 24 are known to the simulation engine 18, each of these parameters is programmatically sampleable by the simulation engine 18. That is, when sampling a ray that intersects with a point on the dog virtual object 32A, the simulation engine 18 may programmatically determine each of the virtual environment parameters 24 associated with that virtual object, such as, for example, a virtual object type, a color value, a material type, etc.

Figure 3:
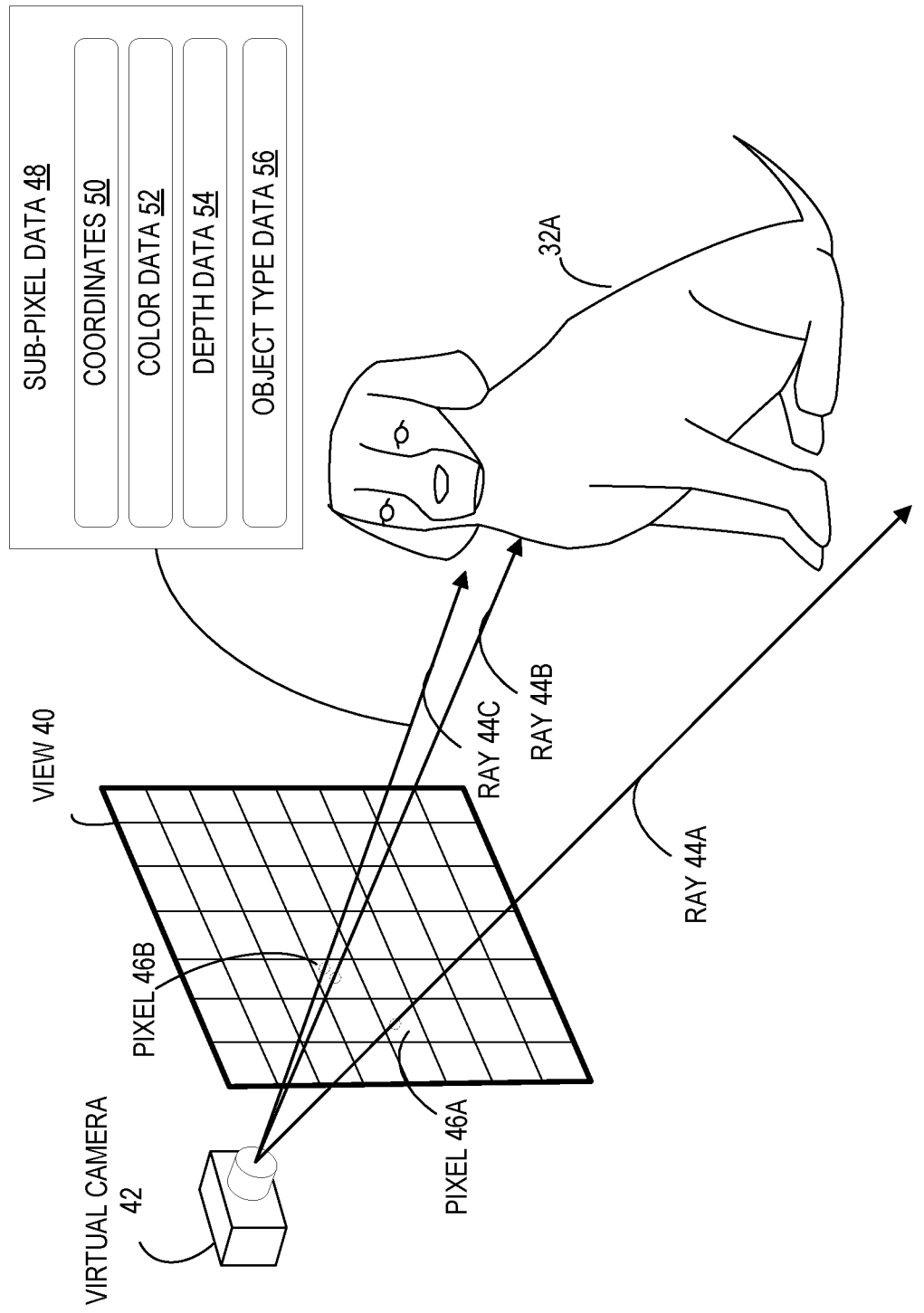
FIG. 3 shows an example ray tracing-based rendering process for rendering the virtual environment simulated by the computer device of FIG. 1.

The simulation engine 18 may further include a ray tracing-based rendering module 38 configured to perform ray tracing to render a view 40 of the simulated virtual environment 20. FIG. 3 illustrates an example ray tracing-based rendering technique used to render the example simulated virtual environment 20 of FIG. 2. As shown, the ray tracing-based rendering module 38 may be configured to render a view of the simulated virtual environment 20 from the perspective of a virtual camera 42. The position and orientation of the virtual camera 42 may be defined in the virtual environment parameters 24. Additionally, distortion, filters, and other types of camera effects may also be defined in the virtual environment parameters 24. To render the view 40 of the simulated virtual environment 20, the rendering module 38 may be configured to generate a plurality of rays 44 for one or more pixels 46 of the rendered view 40 of the simulated virtual environment 20. The rendering module 38 may generate the plurality of rays as originating from the virtual camera 42 and extending into the simulated virtual environment 20. While the example in FIG. 3 illustrates three rays 44A, 44B, and 44C, it should be appreciated that the rendering module 38 may generate any suitable number of rays, such as, for example, one hundred rays, one thousand rays, etc. It will be understood that each ray models the path of a virtual photon within the virtual environment. Suitable techniques for generating the rays may be employed, such as Monte Carlo ray tracing, Whitted ray tracing, etc.

The rendering module 38 may trace the generated rays through the simulated virtual environment 20 and determine whether the rays intersect any virtual objects and/or other types of scene components in the simulated virtual environment 20. The rendering module 38 may then determine sub-pixel data 48 for each of the plurality of rays 44 based on intersections between the plurality of rays 44 and the simulated virtual environment 20. In the example illustrated in FIG. 3, the ray 44A is generated for the pixel 46A and intersects with a background of the simulated virtual environment 20. On the other hand, the rays 44B and 44C have both been generated for the pixel 46B and both intersect with the dog virtual object 32A. The rendering module 38 may programmatically sample the intersected virtual object to determine sub-pixel data 48 for that ray. In the example illustrated in FIG. 3, after determining that the rays 44B and 44C intersect with the dog virtual object 32A, the rendering module 38 may sample the virtual environment parameters 24 associated with the dog virtual object 32A. For example, based on the virtual environment parameters, the rendering module 38 may determine sub-pixel data 48 that includes coordinates 50 for the ray 44. These coordinates may, for example, be two float values (x, y) in image-space of the rendered view 40 of the simulated environment 20. As another example, the sub-pixel data 48 may include color data 52 for the portion of the virtual object intersecting that ray. The color data 52 may be determined for the color channel types such as, for example, 8-bit red-green-blue (RGB), float RGB, half-float RGB, or another suitable color format. As another example, the sub-pixel data 48 may include depth data 54 for the intersection between the ray 44 and the virtual object. As yet another example, the sub-pixel data 48 may include object type data 56, such as, for example, a dog object type as shown in FIG. 3. As a few additional non-limiting examples, the sub-pixel data 48 may further include object segmentation data, normal vector data, object classification data, and object material data. Each of these types of sub-pixel data 48 may be sampled from the simulated virtual environment 20 based on the virtual environment parameters 24. Additionally, it should be appreciated that the types of sub-pixel data 48 discussed above are merely exemplary, and that other types of sub-pixel data 48 may be sampled and determined for the plurality of rays 44.

In one example, the types of sub-pixel data 48 sampled for each ray 44 may be predetermined from a list of base or default types of sub-pixel data 48, such as, for example, color data, depth data, object type data, etc. In another example, the rendering module 38 may be configured to select a type of the sub-pixel data 48 determined for the plurality of rays 44 from a plurality of types of sub-pixel data 48 based on a user selection input. The user selection input may, for example, be received via the input device 16 of the computer device 10. The user selection input may be a selection of one or more types of sub-pixel data 48 from a list via a GUI element. However, it should be appreciated that the types of sub-pixel data 48 may be selected via other input modalities.

In one example, the types of sub-pixel data 48 may be selected from a predetermined list of sub-pixel data 48, such as, for example, a base or default list of types of sub-pixel data 48 the simulation engine 18 is configured to sample. In another example, the list of the plurality of types of sub-pixel data 48 may be extensible. For example, the extensible plug-in module 26 may be configured to provide functions for a user to author new types of sub-pixel data and extensible simulation program logic 28 for sampling the new types of sub-pixel data. The extensible plug-in module 26 may be configured to receive a user input of a new type of sub-pixel data, and add that new type of sub-pixel data to an extensible list of types of sub-pixel data 50. The simulation engine 18 may then determine the new type of sub-pixel data for each of the plurality of rays 44 based on intersections between the plurality of rays 44 and the simulated virtual environment 20.

As a specific example, an example plug-in may provide new simulation program logic 28 and new virtual environment parameters 30 for simulating joint and skeletal movement for a moveable virtual object. Additionally, the example plug-in may further provide a new type of sub-pixel data 50 for sampling a joint or bone type based on an intersection of a ray 44 and a portion of the moveable virtual object. In this manner, the simulation engine 18 may be extended to provide joint and skeletal sub-pixel data that is useful for testing and/or training skeletal tracking algorithms and machine learning models.

Figure 4:
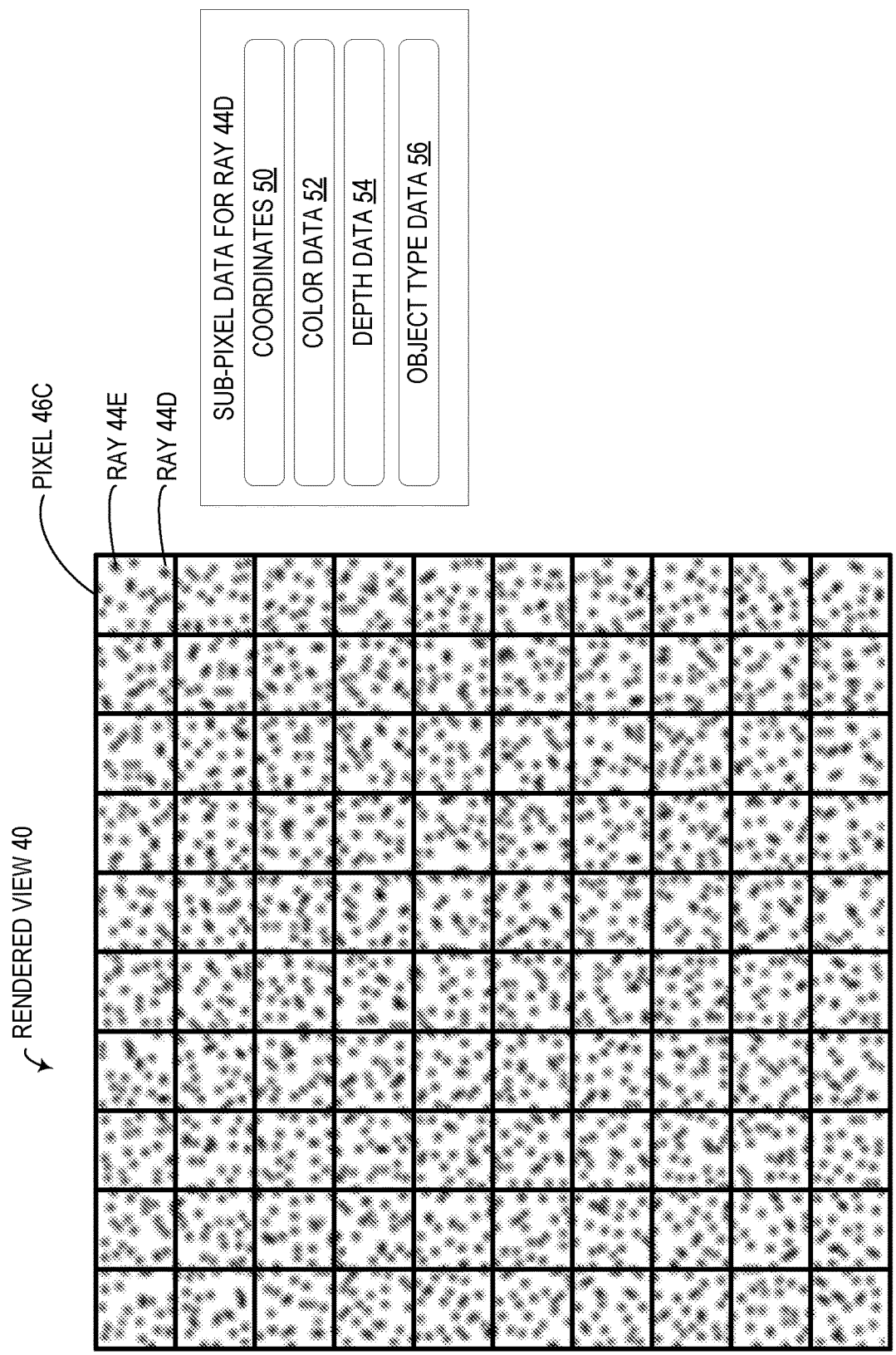
FIG. 4 shows an example distribution of a plurality of rays generated for the rendered view of the virtual environment simulated by the computer device of FIG. 1.

As illustrated in FIG. 1, the processor 12 may be configured to store the determined sub-pixel data 48 for each of the plurality of rays 44 in an image file 58. As a specific example, the image file 58 may take the form of an extension of the EXR format that has multiple channels available at the pixel level for the image. Additionally, metadata indicating the types of sub-pixel data 48 sampled for the plurality of rays 44 may be stored in image metadata of the image file 58. In one example, the processor 12 may be further configured to store pixel value data 60 for each pixel in the rendered view 40 in the image file 58 alongside the sub-pixel data 48. As illustrated in FIG. 4, each pixel in the rendered view 40 contains a plurality of rays 44. Sub-pixel data 48 was sampled for each of the plurality of rays 44, including, for example, color data 52. In one example, for one or more pixels in the rendered view 40 of the simulated environment 20, the processor 12 may be configured to determine a pixel value 60 based on the sub-pixel data 48 determined for the plurality of rays 44 generated for that pixel. As a specific example, the pixel 46C contains example rays 44D and 44E in addition to the other illustrated rays. Both examples rays 44D and 44E have associated sampled sub-pixel data 48. To determine a color value for the pixel 46C, the processor 12 may be configured to calculate an average of the color data 52 determined for each ray 44 contained by the pixel 46C, such as example rays 44D and 44E. The average color value may then be stored in the pixel value data 60 in the image file 58 for that pixel alongside the sub-pixel data 48.

It should be appreciated that the pixel value data 60 determined for each pixel in the rendered view 40 is not limited to color data. For example, the rendered view 40 may take the form of a simulated depth image, and the pixel value data 60 for each pixel may be determined based on an average of the depth data 54 for each ray contained by that pixel. Pixel values for each other type of sub-pixel data may also be determined in a similar manner. As another example, an object classification for a target pixel may be determined based on the object classification sub-pixel data for the rays contained by the target pixel. For example, the object classification having the most associated rays in the target pixel may be selected as the pixel value data 60 for the target pixel.

The image file 58 that includes the stored sub-pixel data 48 and optionally the pixel value data 60 may be used for training and/or testing computer vision related algorithms and machine learning models. As the image file 58 is programmatically generated via computer simulation, the computer device 10 provides the potential benefit of generating images files 58 useful for computer vision and machine learning tasks at scale. Further, these image files 58 include sub-pixel data that may accurately be used as ground truth data in a pixel-perfect manner as ground truth as the world description for the simulated environment is known and predetermined. In comparison, real capture data may typically require a user to manually capture images, which may provide less scalability than programmatically generating images via simulation. Further, ground truth data for real capture data is typically generated post-process, which may potentially be less accurate and less scalable than simulated data.

Figure 5:
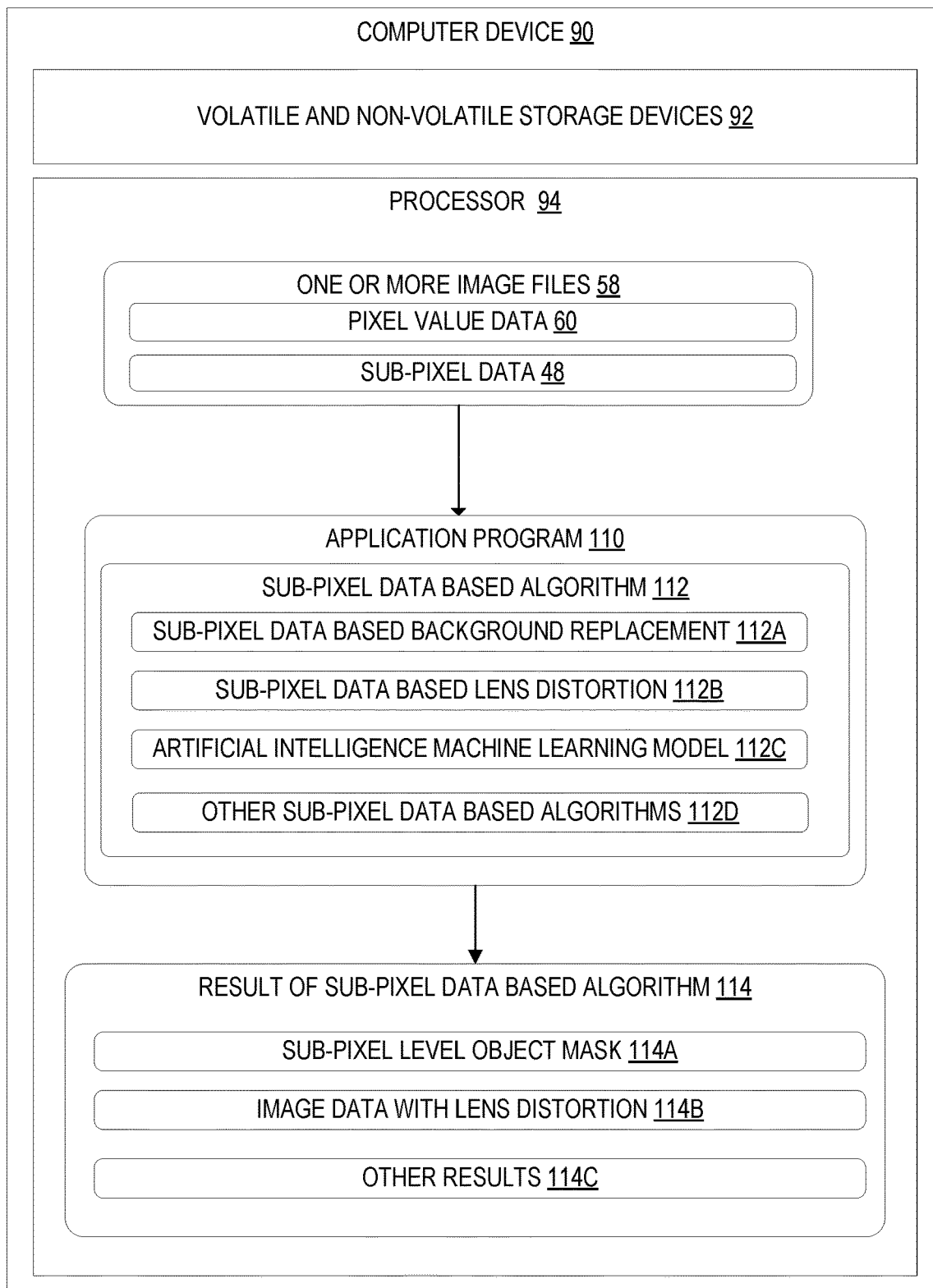
FIG. 5 shows a schematic view of a computer device for processing sub-pixel data in one or more image files using sub-pixel data based algorithms, according to one embodiment of the present disclosure.

Many different computer vision and machine learning related tasks may use the image files 58 generated according to the techniques described above. FIG. 5 illustrates an example computer device 90 for processing the image files 58 that include sub-pixel data 48 using computer vision and machine learning application programs 110. The computer device 90 may include a volatile and non-volatile storage devices 92, a processor 94, and other suitable computer components. In one example, the computer device 90 may generate the one or more image files 58 according to the techniques described herein. In another example, the one or more image files 58 may be generated by another device, such as, for example, the computer device 10 of FIG. 1, and received by the computer device 90.

Generating image files 58 to include sub-pixel data 48 according to the techniques described herein may provide several potential benefits for computer vision and machine learning applications. For example, by including sub-pixel data for a plurality of rays generated for each pixel, the image files 58 provide finer grained and more accurate data than typical image data files. Images that only include pixel level data may potentially be inaccurate at the edges of objects, or when applying pixel mappings and transformations to the pixel data (e.g. lens distortion transformations) that may potentially map one pixel location to a location that lies between pixels in the image, and may thus potentially require interpolation techniques to estimate pixel values. Additionally, the data simulation systems and techniques described herein include extensible plug-in capabilities that provides the potential advantage of enabling users to customize the simulation engine 18 to generate and output any suitable type of sub-pixel data that may further be saved in the image files 58.

One specific example of a computer vision process that may potentially be improved by the sub-pixel data containing image files 58 described herein is background replacement, which may be useful in the process of creating a machine learned model for object recognition. For example, images having the same target object with different backgrounds may be useful for training the model. Rather than fully simulating new virtual environments for each background, performing background replacement techniques may potentially improve efficiency and scalability. Typically, to perform background replacement, an object mask for the target object in the image is generated to identify which pixels belong to the target object and identify which pixels belong to the background. However, these pixel-level object masks are typically unable to produce high quality images on the edges of the target object due to the pixel overlapping both the target object and the background. Thus, as either an object or background value is chosen for that pixel, such as pixel-level object mask may not produce sharp edges for the target object when performing background replacement. Background replacement techniques may potentially be improved by leveraging the finer grained data provided by the sub-pixel data 48 contained in the image files 58 described herein. However, it should be appreciated that the image files 58 and sub-pixel data 48 may provide potential advantages for other types of computer vision and machine learning processes, such as, for example, mapping between different types of lens distortions, training machine learning models using both sub-pixel data and pixel data, etc.

As illustrated in FIG. 5, the processor 94 of the computer device 90 may be configured to execute an application program 110, which may be a computer vision and/or machine learning application. The application program 110 has programming logic including a sub-pixel data based algorithm 112 that is configured to operate on the sub-pixel data 48 contained by the one or more image files 58. As a few specific examples, the sub-pixel data based algorithm 112 may include a sub-pixel data based background replacement algorithm 112A, a sub-pixel data based lens distortion algorithm 112B, and a sub-pixel data based artificial intelligence machine learning model 112C, which will each be described in more detail below. However, it should be appreciated that these sub-pixel data based algorithms 112 are merely exemplary, and that the computer device 90 may be configured to run other types of sub-pixel data based algorithms 112D not specifically described herein, such as, for example, a sub-pixel based resolution scaling algorithm, a sub-pixel data based image compression algorithm, a sub-pixel data based skeletal tracking algorithm, a sub-pixel data based object recognition algorithm, etc.

The processor 94 may be configured to process the one or more images files 58 using a sub-pixel data based algorithm configured to operate on the sub-pixel data 48 of the one or more image files 58, and output a result 114 of the sub-pixel data based algorithm 112. Processes and techniques for operating on sub-pixel data 48 for a sub-pixel data based background replacement algorithm 112A will be described in more detail below with reference to FIGS. 6A, 6B, and 6C. Additionally, processes and techniques for operating on sub-pixel data 48 for a sub-pixel data based lens distortion algorithm 112B will be described in more detail below with reference to FIGS. 7A, 7B, and 7C. Additionally, processes and techniques for operating on sub-pixel data 48 for a sub-pixel data based artificial intelligence machine learning model 112C will be described in more detail below with reference to FIG. 9 and FIGS. 10A and 10B. Other suitable processes and techniques that operate on sub-pixel data 48 not specifically described herein may also be implemented by the processor 94 of the computer device 90.

Figure 6A:
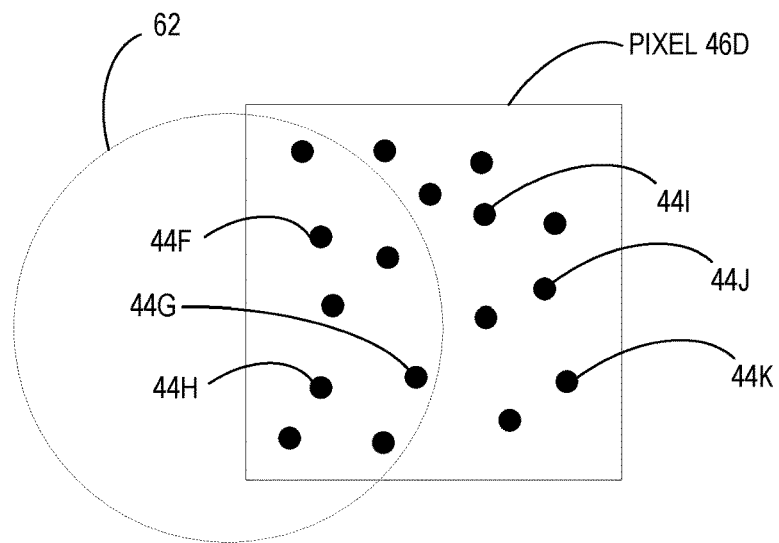
FIG. 6A shows an example pixel overlaid on top of a virtual object of the virtual environment simulated by the computer device of FIG. 1.
Figure 6B:
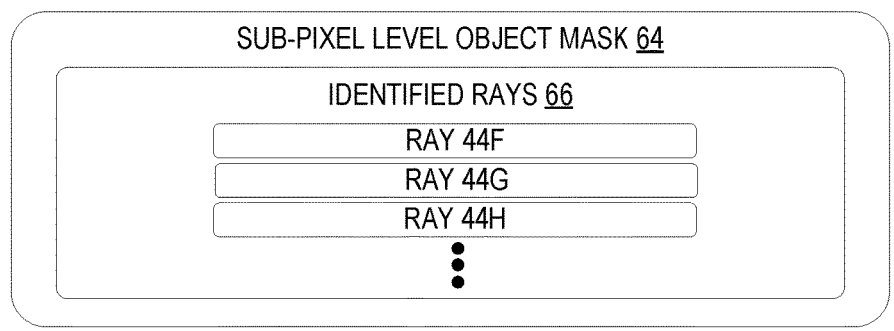
FIG. 6B shows a schematic view of an example sub-pixel object mask generated for performing background replacement on the rendered view of the virtual environment simulated by the computer device of FIG. 1.
Figure 6C:
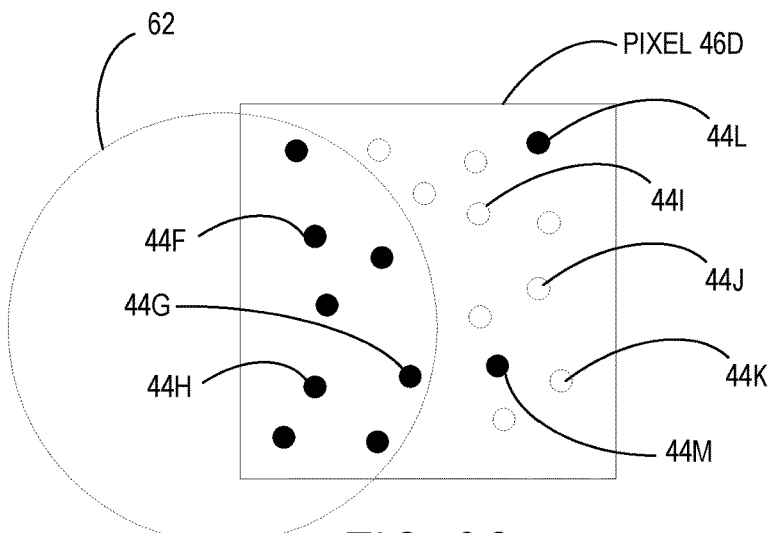
FIG. 6C shows an example background replacement process using the sub-pixel object mask of FIG. 6B.

FIGS. 6A, 6B, and 6C illustrates an example of a sub-pixel data based background replacement algorithm 112A that produces a sub-pixel level object mask 114A as the result 114. FIG. 6A illustrates an example of a pixel 44D that lies on the edge of a target object 62. As shown, example rays 44F, 44G, and 44H intersect with the target object 62. However, examples rays 44I, 44J, and 44K lie outside of the target object 62 and intersect with the background. As there are nine rays that lie outside of the target object and eight rays that lie inside of the target object 62, some example techniques may classify the pixel 46D as a background pixel and thus color the pixel 46D the same color as the background. Further, a pixel-level object mask may identify the pixel 46D as a background pixel, and thus may not include the pixel 46D in the pixel-level object mask. Consequently, during background replacement, the pixel 46D may potentially be replaced even though a portion for the target object 62 lies within the pixel 46D, thus potentially causing visual artifacts on the edges of the target object 62. These visual artifacts may potentially negatively impact the machine learning models that are processing these background replaced images.

FIG. 6B illustrates an example of a sub-pixel level object mask 64 generated for the target object 62 of FIG. 6A. To generate the sub-pixel level object mask 64, the processor 94 of the computer device 90 may be configured to identify one or more rays 44 having determined sub-pixel data 48 indicating that the one or more rays 44 intersected with a target virtual object 62 in the simulated virtual environment 20. As discussed previously, the sub-pixel data 48 for each ray is stored in the image file 58. In this example, the sub-pixel data 48 may include object data such as an object identification for objects that intersect with each ray. Thus, the processor 94 may be configured to determine an object identification for the target object 62, and identify each ray that intersects with the target object 62 based on the sub-pixel data 48 stored in the image file 58. The processor 94 may then generate an object mask 64 for the target object 62 that indicates the identified one or more rays 66. In the illustrated example, the object mask 64 is a data structure that stores a list of the identified one or more rays 66, such as, for example, rays 44F, 44G, 44H, and the other rays that lie on the target object 62 shown in FIG. 6A.

The sub-pixel level object mask 64 may subsequently be used during background replacement for the image. For example, the processor 94 may be configured to replace one or more rays that are not indicated by the object mask 64 for the target object 62 with one or more new rays. In the example illustrated in FIG. 6A, the examples rays 44I, 44J, and 44K lie outside of the target object 62, and thus were not included in the sub-pixel level object mask 64 illustrated in FIG. 6B. Thus, as illustrated in FIG. 6C, the examples rays 44I, 44J, and 44K may be replaced during background replacement, while the example rays 44F, 44G, and 44H are not replaced. In the illustrated example, new rays 44L and 44M were added to the pixel 46D during the background replacement. In this manner, the background rays may each be replaced by new background rays, and pixel values for the image may be recalculated to efficiently generate a new image having both the target object 62 and a new background.

An additional example of a computer vision algorithm that may potentially be improved by the image files storing sub-pixel data described above is an algorithm for the modeling of different lens distortions. Typically, to modify an already rendered image to include a lens distortion effect, such as a fish-eye lens, lens distortion algorithms will remap pixels to different image locations to simulate a target lens distortion. However, the remapping process may potentially remap pixels to image locations that do not have corresponding pixel data in the original image. That is, the remapping may map pixels to a location that is between pixels in the original image. To determine color values for those pixels, these algorithms typically must perform interpolation between multiple pixels in the target area, which may potentially cause incorrect blurring and visual artifacts.

FIGS. 7A, 7B, and 7C illustrate an example sub-pixel data based lens distortion algorithm 112B that includes an example process for regrouping sub-pixel data via transformations to model different types of lens distortions. FIG. 7A illustrates an example rendered view for a first virtual camera lens type 68A, which is rectilinear in the illustrated example. The processor 94 may be configured to receive a user input for a second virtual camera lens type 68B different from the first virtual camera lens type 68A. Rather than fully re-rendering the view of the simulated virtual environment 20 using the second virtual camera lens type 68B, the processor 94 may be configured to perform a ray regrouping process. To generate an image file for the second virtual camera lens types 68B, the processor 94 may be configured determine a transformation 70 between the first virtual camera lens type 68A and the second virtual camera lens type 68B. FIG. 7B illustrates two example transformations 70A and 70B that may be used for regrouping the sub-pixel ray data of the rendered view 40 that was rendered for the first virtual camera lens type 68A.

After determining the transformation, the processor 94 may be configured to regroup the plurality of rays 44 generated for the rendered view 40 of the simulated virtual environment 20 based on the determined transformation 70. As illustrated in FIG. 7C, some of the rays in the sub-pixel data of the rendered view 40 are regrouped based on the transformation 70A or 70B such that they are contained by a different pixel compared to the original rendered view 40. That is, each pixel in the image after the transformation 70A or 70B is applied may contain a different set of rays 44.

The processor 94 may then be configured to, for one or more pixels in the rendered view 40 of the simulated environment 20 for the second virtual camera lens type 68B, determine a pixel value 60 for that pixel based on the sub-pixel data 48 determined for one or more rays 44 that have been regrouped to that pixel. The pixel value 60 may be determined in the same manner described previously. For example, the processor 94 may collect the color data 52 for each ray that has been regrouped to a particular pixel, and determine an average pixel color value or otherwise determine a suitable pixel color value for that pixel based on the collected color data 52. After determining pixel values 60 for each pixel in the image, the resulting image will have a distortion appropriate for the second virtual camera lens type 68B without requiring the simulate virtual environment 20 to be re-rendered, thus potentially improving efficiency.

It should be appreciated that these example use case scenarios for the image file 58 generated by the computer device 10 are merely exemplary, and that other types of computer vision algorithms and machine learning models may be improved by using generated image files 58 and their sub-pixel data 48.

Figure 8:
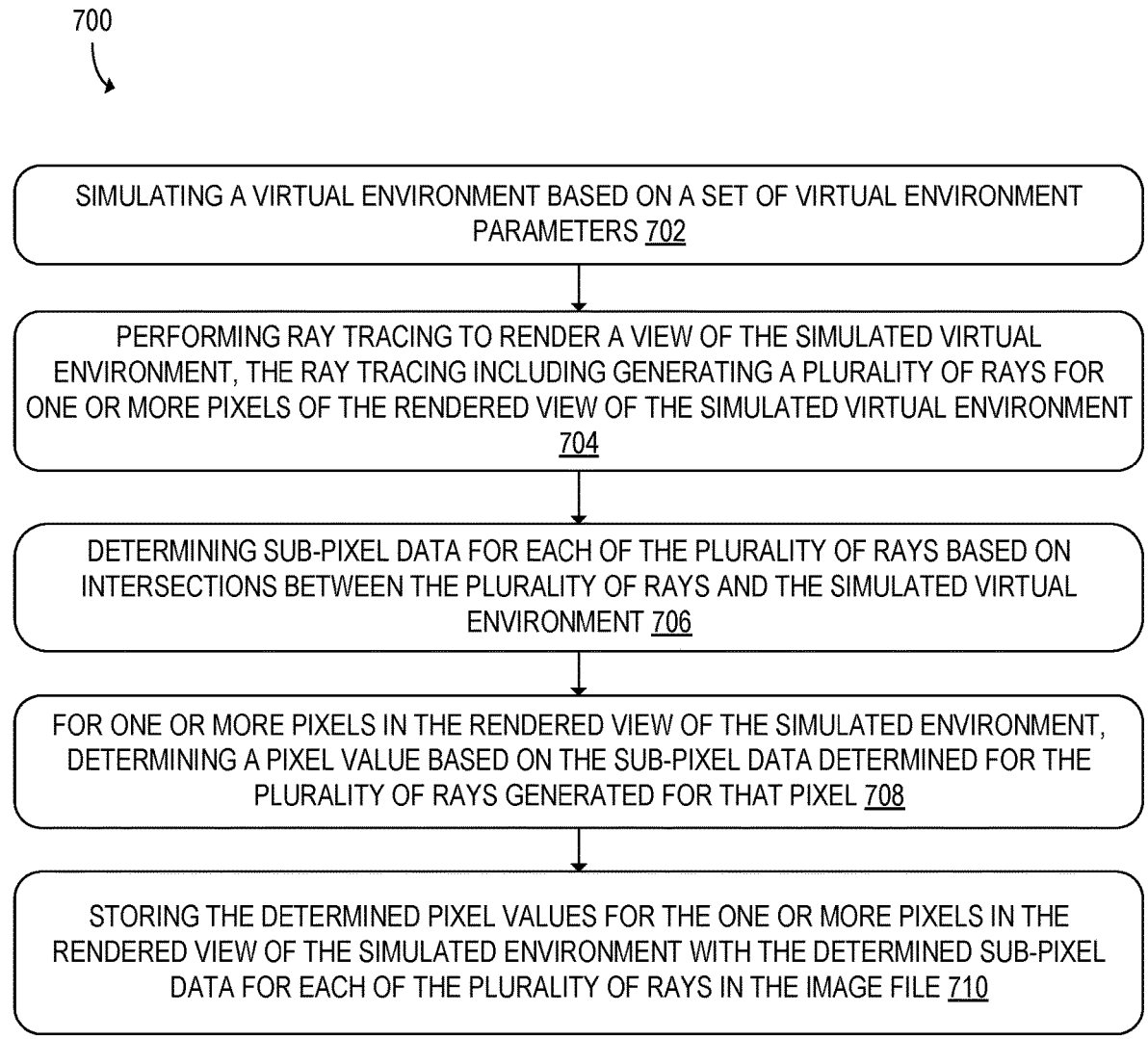
FIG. 8 shows a flowchart of a method for generating image files based on simulated virtual environments that may be implemented by the computer device of FIG. 1.

FIG. 8 shows a flowchart of a computer-implemented method 700. The method 700 may be implemented by the processor 12 of the computer device 10 illustrated in FIG. 1. At 702, the method 700 may include simulating a virtual environment based on a set of virtual environment parameters. In one example, the set of virtual environment parameters may include virtual object types, virtual object dimensions, virtual object materials, environment physics, virtual camera position and orientation, virtual camera lens type, and virtual light sources. However, it should be appreciated that other types of virtual environment parameters may be used at step 702 to simulate a virtual environment. Additional examples of virtual environment parameters are discussed above. Additionally, the set of virtual environment parameters used to simulate the virtual environment at step 702 may be modified based on user input received from a user. For example, a user may select, change, or otherwise modify one or more virtual environment parameters.

At 704, the method 700 may include performing ray tracing to render a view of the simulated virtual environment. An example ray tracing technique is described above with reference to FIG. 3. As shown, the ray tracing technique may include generating a plurality of rays for one or more pixels of the rendered view of the simulated virtual environment. The rays may be generated as originating from a virtual camera and extending into the simulated virtual environment.

At 706, the method 700 may include determining sub-pixel data for each of the plurality of rays based on intersections between the plurality of rays and the simulated virtual environment. In one example, a type of sub-pixel data determined for each of the plurality of rays may include coordinates for the ray, color data, depth data, object segmentation data, normal vector data, object classification data, and object material data. However, it should be appreciated that other types of sub-pixel data may be sampled for each ray during step 706 of method 700. Additional examples of other types of sub-pixel data are discussed above. Additionally, the types of sub-pixel data determined for each ray at step 706 may be selected based on a user selection input, such as, for example, a user selection of one or more types of sub-pixel data from a list of default or base types.

In another example, the types of sub-pixel data are extensible. An extensible plug-in module 26 that provides an API that includes functions for a user to author a set of new types of sub-pixel data, as well as simulation program logic for sampling the new types of sub-pixel data is discussed above with reference to FIG. 1. For example, step 706 of method 700 may optionally further include receiving a user input of a new type of sub-pixel data, and determining the new type of sub-pixel data for each of the plurality of rays based on intersections between the plurality of rays and the simulated virtual environment.

At 708, the method 700 may include, for one or more pixels in the rendered view of the simulated environment, determining a pixel value based on the sub-pixel data determined for the plurality of rays generated for that pixel. An example technique for determining pixel values is discussed above with reference to FIG. 4. In one example, the pixel value for a particular pixel may be determined based on an average value for a particular type of sub-pixel data for each ray contained by that particular pixel. For example, the color data for each ray contained by that particular pixel may be averaged, or a color value having a majority may be selected, in order to determine a color value for the pixel value.

At 710, the method 700 may include storing the determined pixel values for the one or more pixels in the rendered view of the simulated environment with the determined sub-pixel data for each of the plurality of rays in an image file. As a specific example, the image file 58 may take the form of an extension of the EXR format that has multiple channels available at the pixel level for the image. Additionally, metadata indicating the types of sub-pixel data 48 sampled for the plurality of rays 44 may be stored in image metadata of the image file 58. The image file generate at step 710 of method 700 may be used to improve computer vision and machine learning related tasks, such as, for example, the object mask task discussed above with reference to FIGS. 5A, 5B, and 5C, and the lens distortion computer vision task discussed above with reference to FIGS. 6A, 6B, and 6C.

Figure 9:
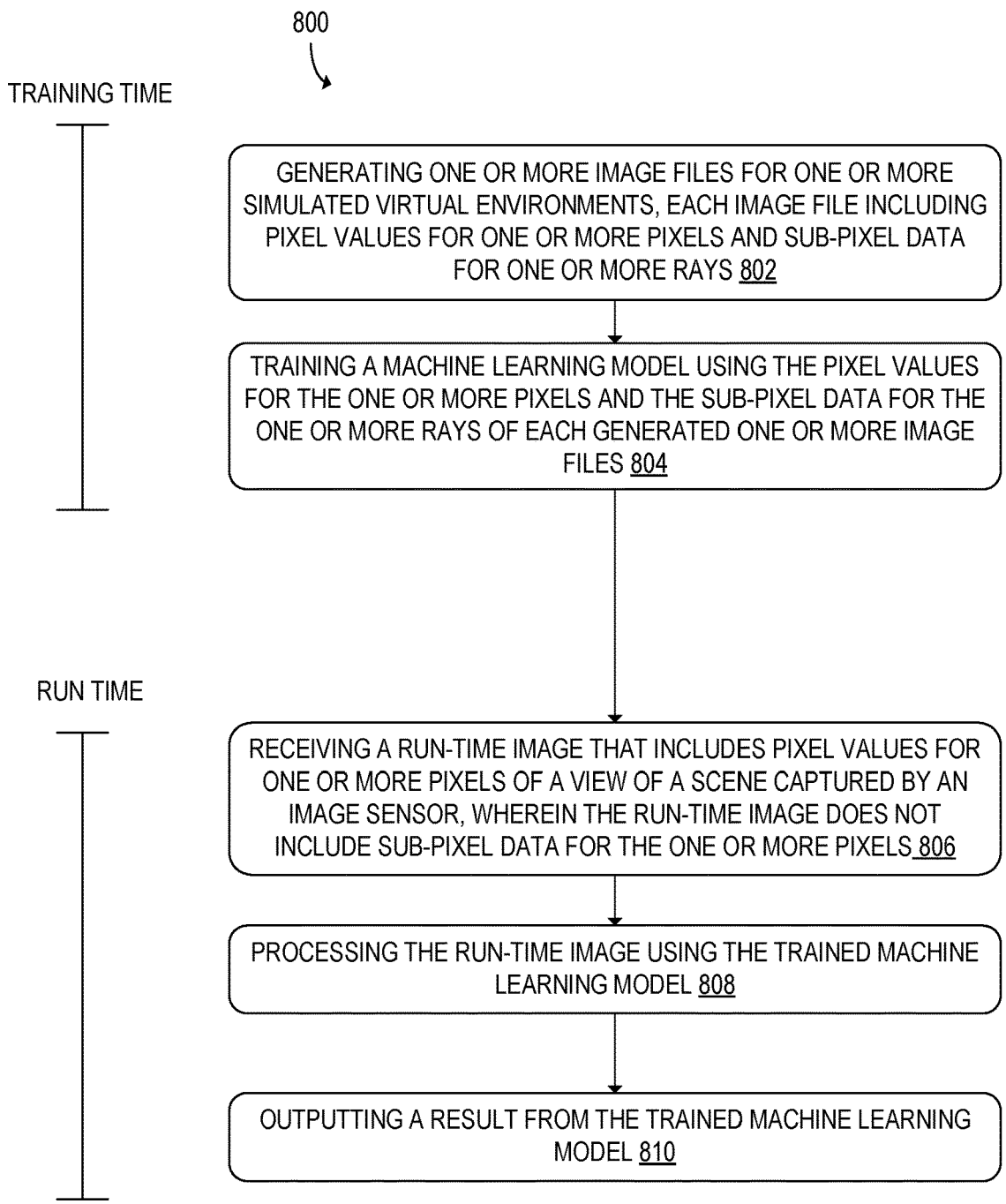
FIG. 9 shows a flowchart of a method for training a machine learning model and processing run-time images using the trained machine learning model that may be trained using the sub-pixel data generated by the computer device of FIG. 1.
Figures 10A, 10B:
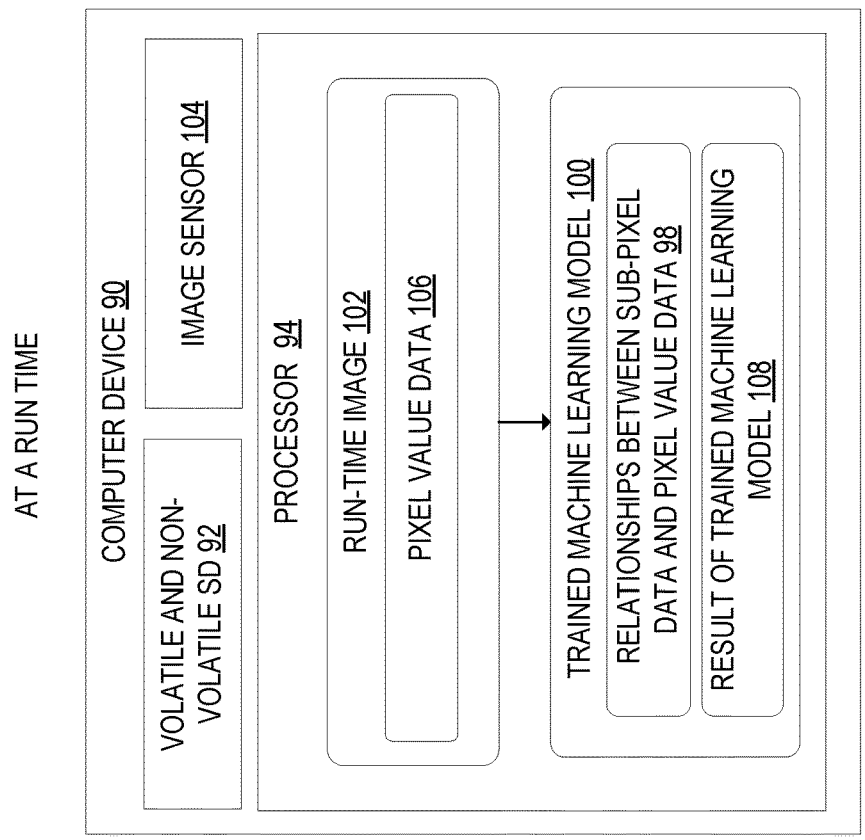
FIG. 10A shows an example computer device for training a machine learning model.
FIG. 10B shows an example computer device for processing run-time images using the machine learning model trained by the computer device of FIG. 10A.

FIG. 9 and FIGS. 10A and 10B illustrate example processes and methods for a sub-pixel data based artificial intelligence machine learning model 112C. FIG. 9 shows a flowchart of a computer-implemented method 800 for training a machine learning model using the image files generated according to the method 700. The method 800 may be implemented by the processor 94 of the computer device 90 illustrated in FIG. 5, and/or the processor 12 of the computer device 10 illustrated in FIG. 1. The method 800 includes, at a training time, steps 802 and 804. The method 800 also includes, at a run time, steps 806, 808, and 810.

At 802, the method 800 may include generating one or more image files for one or more simulated virtual environments, each image file including pixel values for one or more pixels and sub-pixel data for one or more rays. The image files may be generated according to the method 700 described above with reference to FIG. 8. In one example, image files for different virtual environments 20 simulated using different virtual environment parameters 24 may be generated at step 802. In another example, the background replacement technique described above with reference to FIGS. 5A, 5B, and 5C may be used to generate multiple image files based on a single rendered view of a simulated virtual environment 20 by replacing the background with different variations for each image file. As yet another example, the lens distortion transformation technique described above with reference to FIGS. 6A, 6B, and 6C may be used to generate multiple image files based on a single rendered view of a simulated virtual environment 20 by regrouping the contained rays based on computed transformations for different virtual camera lens types.

At 804, the method 800 may include training a machine learning model using the pixel values for the one or more pixels and the sub-pixel data for the one or more rays of each generated one or more image files. FIG. 10 illustrates an example computer device 90 for training a machine learning model. The computer device 90 may include a volatile and non-volatile storage devices 92, a processor 94, and other suitable computer components. In one example, the computer device 90 may generate the one or more image files 58. In another example, the one or more image files 58 may be generated by another device and received by the computer device 90.

The processor 94 may be configured to, at a training time, feed the one or more image files 58 to a machine learning model 96. The machine learning model 96 may be implemented using any combination of state-of-the-art and/or future machine learning (ML) and/or artificial intelligence (AI). Non-limiting examples of techniques that may be incorporated in an implementation of the machine learning model 96 may include support vector machines, multi-layer neural networks, convolutional neural networks (e.g., including spatial convolutional networks for processing images and/or videos, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases).

In some examples, the methods and processes machine learning model 96 described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Using these techniques, the machine learning model 96 may be configured to process the one or more image files 58 to identify relationships 98 between the sub-pixel data 48 and the pixel values data 60 of the one or more image files 58 fed to the machine learning module 96. It should be appreciated that any suitable number of image files 58 may be generated according to the techniques described herein and fed to the machine learning model 96, such as, for example, a thousand image files 58, a hundred thousand image files 58, etc.

The machine learning model 96 may be configured to recognized and learn different types of relationships between the sub-pixel data 48 and the pixel value data 60 of the one or more image files 58. As a specific example, the machine learning model 96 may be fed a plurality of image files 58 for different lens distortion effects. For example, a plurality of different image files for different virtual camera lens types may be generated for the same view of a simulated virtual environment. As a few non-limiting examples, image files for a fish-eye lens, a rectilinear lens, and another type of lens may be generated for the same view of a simulated virtual environment according to the techniques described above with reference to FIGS. 6A, 6B, and 6C. Based on the plurality of image files 58, the machine learning model 96 may be trained to recognize how different lens distortions affect the relationship between the sub-pixel data 48 for the plurality of rays and the pixel value data 60 for the plurality of pixels in the image. In this manner, the machine learning model 96 may be trained to recognize and learn how different lens distortion effects will change the pixel value data 60 of the image compared to the underlaying sub-pixel data 48 which may remain the same between those images. After being trained in this manner, the machine learning model 96 may become more robust regarding lens distortion effects, and may thus have improved accuracy when processing real run-time images that may be captured using a variety of camera lenses. It should be appreciated that the lens distortion training discussed above is merely exemplary, and that the machine learning model 96 may be trained to learn other types of inferences and relationships between sub-pixel data 48 and pixel value data 60.

Turning back to FIG. 9, at 806, the method 800 may include receiving a run-time image that includes pixel values for one or more pixels of a view of a scene captured by an image sensor, wherein the run-time image does not include sub-pixel data for the one or more pixels. FIG. 10B illustrates the computer device 90 after the machine learning model has been trained as discussed above using the one or more image files 58. The processor 94 of the computer device 90 may be configured to execute the trained machine learning model 100 to process one or more run-time images 102.

In one example, the run-time images 102 are real images captured by an image sensor 104 of the computer device 90. In another example, the one or more run-time images 102 may be captured by the image sensor of another device, such as, for example, another computer device, a user's camera device, etc., and received by the computer device 90. In these examples, the run-time images 102 are real images captured by a physical image sensor 104, and thus include pixel value data 106 for one or more pixels of a view of the scene being captured by the image sensor 104, and do not include sub-pixel data sampled for rays generated in a simulation.

At 808, the method 800 may include processing the run-time image 102 using the trained machine learning model. The trained machine learning model 100 may be configured to process the run-time images 102 based on the identified relationships 98 between sub-pixel data 48 and pixel value data 60. Even though the run-time images 102 may not include sub-pixel data 48, the trained machine learning model 100 may nonetheless apply the learned relationships 98 to the run-time images 102 based on the pixel value data 106 that is included in the run-time images 102. For example, using the learned relationships between lens distortion effects discussed above, the trained machine learning model 100 may apply these learned relationships to the run-time images 102 such that the trained machine learning model 100 may suitable translate between different potential lens distortion effects and thus become more robust at performing Computer Visions tasks on the run-time image 102. For example, the trained machine learning model 100 may be trained to identify a target object across different run-time images 102 having been captured using multiple different image sensors 104 having multiple different types of lens, such as, for example, fish-eye lenses, rectilinear lenses, etc.

At 810, the method 800 may include outputting a result 108 from the trained machine learning model 100. For example, the result 108 may include a target object that has been recognized and tracked across multiple run-time images 102 having different lens distortion effects.

In the manner described above, machine learning models 96 may be trained using the image files 58 that include both pixel value data 60 and sub-pixel data 48 generated using simulation techniques described herein. These image files 58 may provide the potential benefit of increase scalability and accuracy compared to real captured images that have been manually annotated by a human. These image files 58 may further provide the potential benefits of training the machine learning model 96 to relationships based on sub-pixel data 48 that the machine learning model 96 may be unable to learn through real-captured images.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
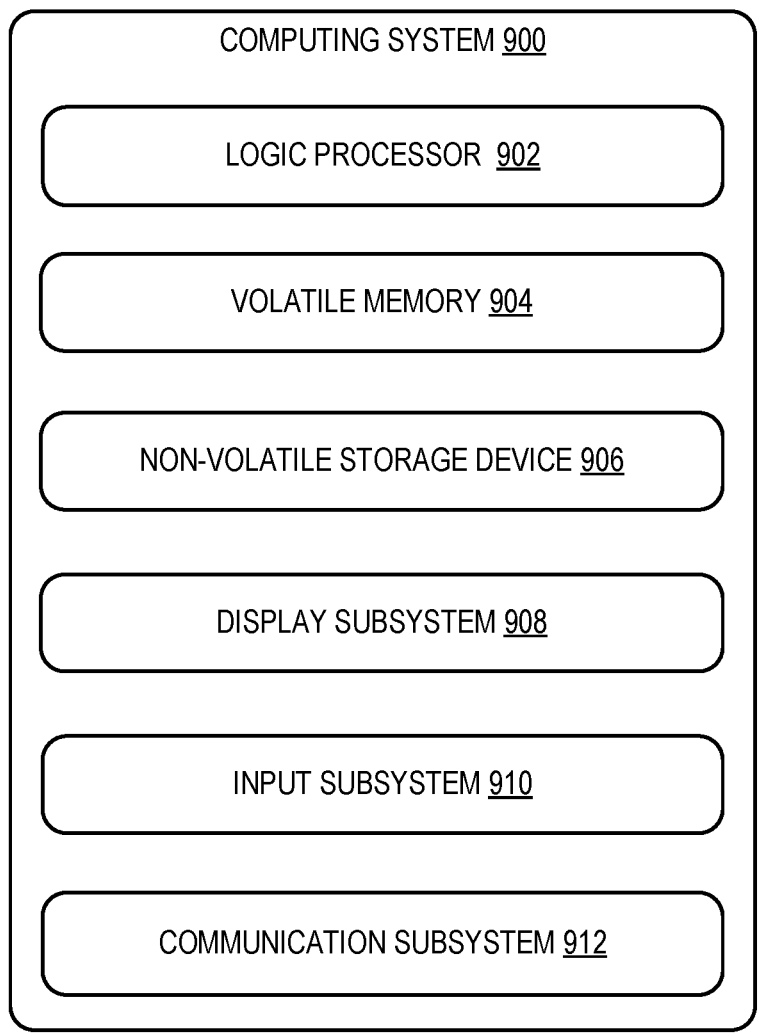
FIG. 11 shows a schematic view of an example computing environment in which the computer device of FIG. 1 may be enacted.

FIG. 11 schematically shows a non-limiting embodiment of a computing system 900 that can enact one or more of the methods and processes described above. Computing system 900 is shown in simplified form. Computing system 900 may embody the computer device 10 and computer device 90 described above and illustrated in FIGS. 1 and 5. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 11.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computer device comprising a processor configured to simulate a virtual environment based on a set of virtual environment parameters, and perform ray tracing to render a view of the simulated virtual environment. The ray tracing includes generating a plurality of rays for one or more pixels of the rendered view of the simulated virtual environment. The processor is further configured to determine sub-pixel data for each of the plurality of rays based on intersections between the plurality of rays and the simulated virtual environment, and store the determined sub-pixel data for each of the plurality of rays in an image file. In this aspect, additionally or alternatively, a type of sub-pixel data determined for each of the plurality of rays may be selected from the group consisting of coordinates for the ray, color data, depth data, object segmentation data, normal vector data, object classification data, and object material data. In this aspect, additionally or alternatively, the processor may be further configured to, for one or more pixels in the rendered view of the simulated environment, determine a pixel value based on the sub-pixel data determined for the plurality of rays generated for that pixel. The processor may be further configured to store the determined pixel values for the one or more pixels in the rendered view of the simulated environment with the determined sub-pixel data for each of the plurality of rays in the image file. In this aspect, additionally or alternatively, the set of virtual environment parameters may be selected from the group consisting of virtual object types, virtual object dimensions, virtual object materials, environment physics, virtual camera position and orientation, virtual camera lens type, and virtual light sources. In this aspect, additionally or alternatively, the processor may be configured to select a type of the sub-pixel data determined for the plurality of rays from a plurality of types of sub-pixel data based on a user selection input. In this aspect, additionally or alternatively, the plurality of types of sub-pixel data may be extensible, and the processor may be configured to receive a user input of a new type of sub-pixel data, and determine the new type of sub-pixel data for each of the plurality of rays based on intersections between the plurality of rays and the simulated virtual environment. In this aspect, additionally or alternatively, the processor may be further configured to receive one or more image files that include sub-pixel data for one or more pixels in the one or more image files, process the one or more images files using a sub-pixel data based algorithm configured to operate on the sub-pixel data of the one or more image files; and output a result of the sub-pixel data based algorithm. In this aspect, additionally or alternatively, to process the one or more images files using a sub-pixel data based algorithm, the processor may be further configured to identify one or more rays having determined sub-pixel data indicating that the one or more rays intersected with a target virtual object in the simulated virtual environment, and generate an object mask for the target object that indicates the identified one or more rays. In this aspect, additionally or alternatively, the processor may be further configured to replace one or more rays that are not indicated by the object mask for the target object with one or more new rays. In this aspect, additionally or alternatively, the rendered view of the simulated virtual environment may be rendered for a first virtual camera lens type, and to process the one or more images files using a sub-pixel data based algorithm, the processor may be further configured to receive a user input for a second virtual camera lens type different from the first virtual camera lens type, determine a transformation between the first virtual camera lens type and the second virtual camera lens type, and regroup the plurality of rays generated for the rendered view of the simulated virtual environment based on the determined transformation. In this aspect, additionally or alternatively, the processor may be further configured to, for one or more pixels in the rendered view of the simulated environment for the second virtual camera lens type, determine a pixel value for that pixel based on the sub-pixel data determined for one or more rays that have been regrouped to that pixel. In this aspect, additionally or alternatively, the processor may be further configured to, at a training time, generate one or more image files for one or more simulated virtual environments. Each image file may include pixel values for one or more pixels and sub-pixel data for one or more rays. The processor may be further configured to, at the training time, train a machine learning model using the pixel values for the one or more pixels and the sub-pixel data for the one or more rays of each generated one or more image files. The processor may be further configured to, at a run time, receive a run-time image that includes pixel values for one or more pixels of a view of a scene captured by an image sensor. The run-time image may not include sub-pixel data for the one or more pixels. The processor may be further configured to, at the run-time, process the run-time image using the trained machine learning model, and output a result from the trained machine learning model.

Another aspect provides a method comprising, at a processor, simulating a virtual environment based on a set of virtual environment parameters, and performing ray tracing to render a view of the simulated virtual environment. The ray tracing may include generating a plurality of rays for one or more pixels of the rendered view of the simulated virtual environment. The method further comprises determining sub-pixel data for each of the plurality of rays based on intersections between the plurality of rays and the simulated virtual environment, and storing the determined sub-pixel data for each of the plurality of rays in an image file. In this aspect, additionally or alternatively, the method may further comprise, for one or more pixels in the rendered view of the simulated environment, determining a pixel value based on the sub-pixel data determined for the plurality of rays generated for that pixel. The method may further comprise storing the determined pixel values for the one or more pixels in the rendered view of the simulated environment with the determined sub-pixel data for each of the plurality of rays in the image file. In this aspect, additionally or alternatively, the method may further comprise selecting a type of the sub-pixel data determined for the plurality of rays from a plurality of types of sub-pixel data based on a user selection input. In this aspect, additionally or alternatively, the plurality of types of sub-pixel data may be extensible. In this aspect, additionally or alternatively, the method may further comprise receiving a user input of a new type of sub-pixel data, and determining the new type of sub-pixel data for each of the plurality of rays based on intersections between the plurality of rays and the simulated virtual environment. In this aspect, additionally or alternatively, the method may further comprise, at a training time, generating one or more image files for one or more simulated virtual environments. Each image file may include pixel values for one or more pixels and sub-pixel data for one or more rays. The method may further comprise, at the training time, training a machine learning model using the pixel values for the one or more pixels and the sub-pixel data for the one or more rays of each generated one or more image files. The method may further comprise, at a run-time, receiving a run-time image that includes pixel values for one or more pixels of a view of a scene captured by an image sensor. The run-time image may not include sub-pixel data for the one or more pixels. The method may further comprise, at the run-time, processing the run-time image using the trained machine learning model, and outputting a result from the trained machine learning model. In this aspect, additionally or alternatively, the method may further comprise receiving one or more image files that include sub-pixel data for one or more pixels in the one or more image files, processing the one or more images files using a sub-pixel data based algorithm configured to operate on the sub-pixel data of the one or more image files, and outputting a result of the sub-pixel data based algorithm.

Another aspect provides a computer device comprising a processor configured to simulate a virtual environment based on a set of virtual environment parameters, render a view of the simulated virtual environment from a perspective of a virtual camera in the virtual environment, determine a plurality of sub-pixel data for one or more pixels in the rendered view of the simulated environment, determine a pixel value for the one or more pixels based on the plurality of sub-pixel data, and store the determined sub-pixel data and the determined pixel value for the one or more pixels in an image file.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
a processor configured to:
simulate a virtual environment based on a set of virtual environment parameters;
receive a user selection input of one or more types of sub-pixel data from an extensible plurality of types of sub-pixel data to be collected during rendering of a view of the virtual environment, the user selection input including at least a user inputted new type of sub-pixel data;
perform ray tracing to render a view of the simulated virtual environment, the ray tracing including generating a plurality of rays for one or more pixels of the rendered view of the simulated virtual environment;
determine sub-pixel data for the one or more types of sub-pixel data including at least the user inputted new type of sub-pixel data for each of the plurality of rays based on intersections between the plurality of rays and the simulated virtual environment; and
store the determined sub-pixel data for each of the plurality of rays in an image file.

2. The computer device of claim 1, wherein a type of sub-pixel data determined for each of the plurality of rays is selected from the group consisting of coordinates for the ray, color data, depth data, object segmentation data, normal vector data, object classification data, and object material data.

3. The computer device of claim 1, wherein the processor is further configured to:
for one or more pixels in the rendered view of the simulated environment, determine a pixel value based on the sub-pixel data determined for the plurality of rays generated for that pixel; and
store the determined pixel values for the one or more pixels in the rendered view of the simulated environment with the determined sub-pixel data for each of the plurality of rays in the image file.

4. The computer device of claim 1, wherein the set of virtual environment parameters are selected from the group consisting of virtual object types, virtual object dimensions, virtual object materials, environment physics, virtual camera position and orientation, virtual camera lens type, and virtual light sources.

5. The computer device of claim 1, wherein the processor is further configured to:
receive one or more image files that include sub-pixel data for one or more pixels in the one or more image files;
process the one or more image files using a sub-pixel data based algorithm configured to operate on the sub-pixel data of the one or more image files; and
output a result of the sub-pixel data based algorithm.

6. The computer device of claim 5, wherein to process the one or more image files using a sub-pixel data based algorithm, the processor is further configured to:

identify one or more rays having determined sub-pixel data indicating that the one or more rays intersected with a target virtual object in the simulated virtual environment; and generate an object mask for the target object that indicates the identified one or more rays.

7. The computer device of claim 6, wherein the processor is further configured to replace one or more rays that are not indicated by the object mask for the target object with one or more new rays.

8. The computer device of claim 5, wherein the rendered view of the simulated virtual environment is rendered for a first virtual camera lens type; and wherein to process the one or more image files using a sub-pixel data based algorithm, the processor is further configured to:

receive a user input for a second virtual camera lens type different from the first virtual camera lens type;

determine a transformation between the first virtual camera lens type and the second virtual camera lens type; and regroup the plurality of rays generated for the rendered view of the simulated virtual environment based on the determined transformation.

9. The computer device of claim 8, wherein the processor is further configured to:

for one or more pixels in the rendered view of the simulated environment for the second virtual camera lens type, determine a pixel value for that pixel based on the sub-pixel data determined for one or more rays that have been regrouped to that pixel.

10. The computer device of claim 5, wherein to process the one or more image files using a sub-pixel data based algorithm, the processor is further configured to:

at a training time:

generate one or more image files for one or more simulated virtual environments, each image file including pixel values for one or more pixels and sub-pixel data for one or more rays;

train a machine learning model using the pixel values for the one or more pixels and the sub-pixel data for the one or more rays of each generated one or more image files;

at a run time:

receive a run-time image that includes pixel values for one or more pixels of a view of a scene captured by an image sensor, wherein the run-time image does not include sub-pixel data for the one or more pixels;

process the run-time image using the trained machine learning model; and output a result from the trained machine learning model.

11. A method comprising:

at one or more processors at a training time:

generating one or more image files for one or more simulated virtual environments, each image file including pixel values for one or more pixels and sub-pixel data for one or more rays, wherein generating the one or more image files includes:

simulating a virtual environment based on a set of virtual environment parameters;

performing ray tracing to render a view of the simulated virtual environment, the ray tracing including generating a plurality of rays for one or more pixels of the rendered view of the simulated virtual environment;

determining sub-pixel data for each of the plurality of rays based on intersections between the plurality of rays and the simulated virtual environment; and storing the determined sub-pixel data for each of the plurality of rays in an image file of the one or more image files;

training a machine learning model using the pixel values for the one or more pixels and the sub-pixel data for the one or more rays of each generated one or more image files;

at the one or more processors at a run time:

receiving a run-time image that includes pixel values for one or more pixels of a view of a scene captured by an image sensor, wherein the run-time image does not include sub-pixel data for the one or more pixels;

processing the run-time image using the trained machine learning model; and outputting a result from the trained machine learning model.

12. The method of claim 11, further comprising:

for one or more pixels in the rendered view of the simulated environment, determining a pixel value based on the sub-pixel data determined for the plurality of rays generated for that pixel; and storing the determined pixel values for the one or more pixels in the rendered view of the simulated environment with the determined sub-pixel data for each of the plurality of rays in the image file.

13. The method of claim 11, further comprising selecting a type of the sub-pixel data determined for the plurality of rays from a plurality of types of sub-pixel data based on a user selection input.

14. The method of claim 13, wherein the plurality of types of sub-pixel data is extensible.

15. The method of claim 14, further comprising:

receiving a user input of a new type of sub-pixel data; and determining the new type of sub-pixel data for each of the plurality of rays based on intersections between the plurality of rays and the simulated virtual environment.

16. The method of claim 11, further comprising:

receiving one or more image files that include sub-pixel data for one or more pixels in the one or more image files;

processing the one or more image files using a sub-pixel data based algorithm configured to operate on the sub-pixel data of the one or more image files; and outputting a result of the sub-pixel data based algorithm.

17. A computer device comprising:

a processor configured to:

simulate a virtual environment based on a set of virtual environment parameters;

perform ray tracing to render a view of the simulated virtual environment, the ray tracing including generating a plurality of rays for one or more pixels of the rendered view of the simulated virtual environment;

determine sub-pixel data for each of the plurality of rays based on intersections between the plurality of rays and the simulated virtual environment;

store the determined sub-pixel data for each of the plurality of rays in an image file;

receive one or more image files that include sub-pixel data for one or more pixels in the one or more image files;

process the one or more image files using a sub-pixel data based algorithm configured to operate on the sub-pixel data of the one or more image files, wherein to process the one or more image files using the sub-pixel data based algorithm the processor is configured to:

identify one or more rays having determined sub-pixel data indicating that the one or more rays intersected with a target virtual object in the simulated virtual environment;

generate an object mask for the target object that indicates the identified one or more rays;

replace one or more rays that are not indicated by the object mask for the target object with one or more new rays; and output a result of the sub-pixel data based algorithm.

18. The computer device of claim 17, wherein the rendered view of the simulated virtual environment is rendered for a first virtual camera lens type; and wherein to process the one or more image files using the sub-pixel data based algorithm, the processor is further configured to:

receive a user input for a second virtual camera lens type different from the first virtual camera lens type;

determine a transformation between the first virtual camera lens type and the second virtual camera lens type; and regroup the plurality of rays generated for the rendered view of the simulated virtual environment based on the determined transformation.

19. The computer device of claim 18, wherein the processor is further configured to:

for one or more pixels in the rendered view of the simulated environment for the second virtual camera lens type, determine a pixel value for that pixel based on the sub-pixel data determined for one or more rays that have been regrouped to that pixel.

20. The computer device of claim 17, wherein the processor is further configured to:

at a training time:

generate one or more image files for one or more simulated virtual environments, each image file including pixel values for one or more pixels and sub-pixel data for one or more rays;

train a machine learning model using the pixel values for the one or more pixels and the sub-pixel data for the one or more rays of each generated one or more image files;

at a run time:

receive a run-time image that includes pixel values for one or more pixels of a view of a scene captured by an image sensor, wherein the run-time image does not include sub-pixel data for the one or more pixels;

process the run-time image using the trained machine learning model; and output a result from the trained machine learning model.

* * * * *